Aug. 21, 1934.   W. J. COTTON   1,970,597
SAMPLING APPARATUS
Filed May 22, 1931
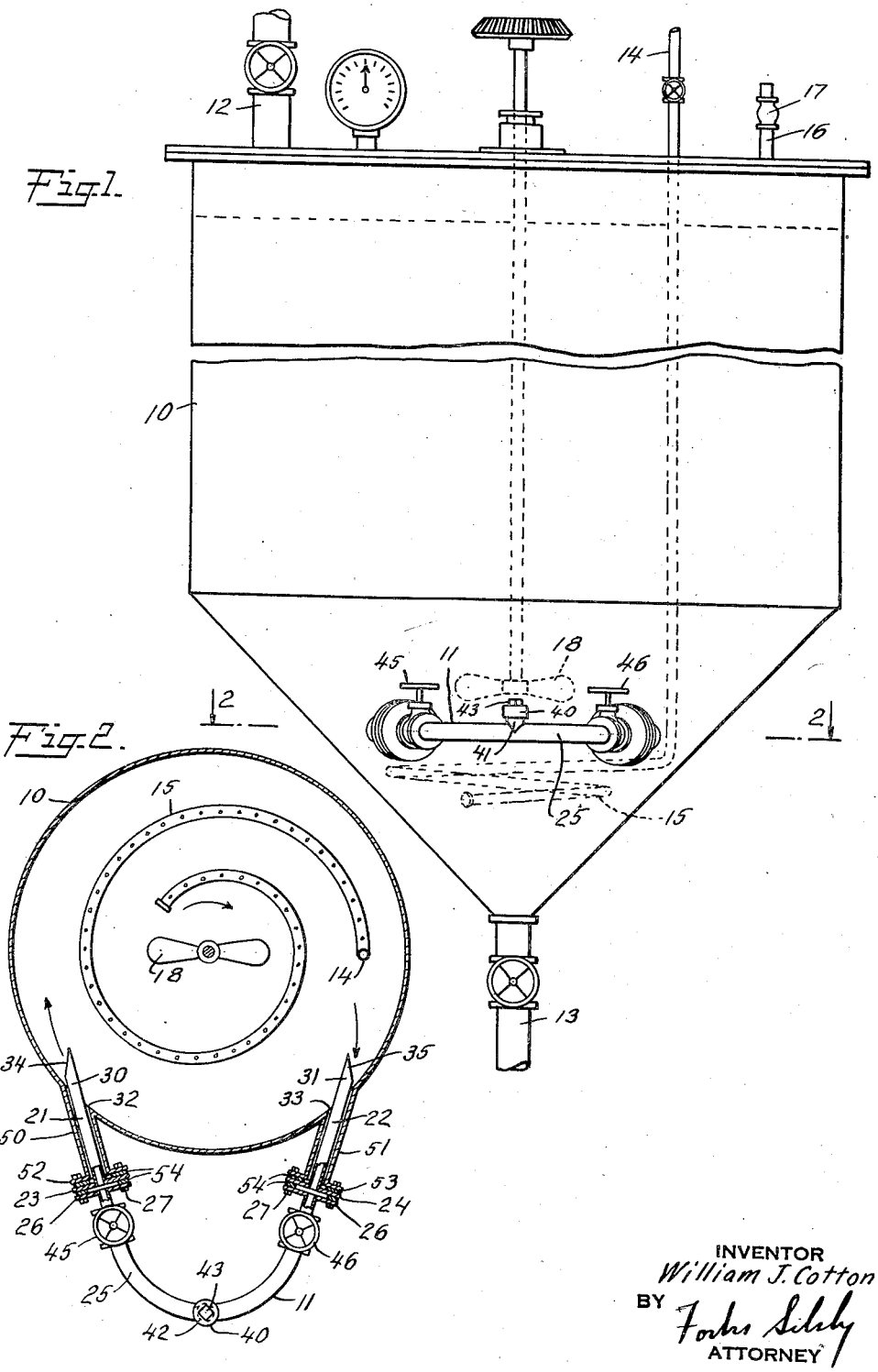
INVENTOR
William J. Cotton
BY
ATTORNEY Patented Aug. 21, 1934

1,970,597

UNITED STATES PATENT OFFICE 1,970,597

SAMPLING APPARATUS

William J. Cotton, Buffalo, N. Y., assignor to National Aniline & Chemical Co. Inc., New York, N. Y., a corporation of New York Application May 22, 1931, Serial No. 539,255

10 Claims. (Cl. 259—1)

This invention relates to an apparatus for sampling material in liquid form, and more particularly to an apparatus for sampling and testing a liquid reaction mixture. It includes an apparatus for measuring the hydrogen ion concentration of a solution which is contained in a closed vessel and with which material is being mixed, as well as an apparatus for controlling the feed of said material to said vessel.

In the manufacture of chemical products, it is frequently desirable to obtain definite information of the condition of a reaction mixture or material. In general, a small portion or sample of the reaction mixture or material is taken and tests are made upon the sample to furnish the desired information.

Certain processes require the addition of a material to a reaction mixture until a particular condition of the mixture has been reached; as for example, a desired concentration, or the endpoint of a reaction. In some cases it is essential that the addition of the material be interrupted within a short time after the desired condition has been reached, which in practice requires frequent testing and observation of the mixture by a skilled operator, thereby adding to the cost of manufacturing the product.

In many cases, the reaction mixture or other material is contained in a closed vessel; as for example, when the material contains a noxious or poisonous gas, or when the material must be maintained under superatmospheric or subatmospheric pressure. This renders the taking of a sample difficult; and the sample is frequently unrepresentative of the whole mixture, so that inaccurate results are obtained. Moreover, when repeated tests must be made, the cumulative loss of material, removed from the vessel as samples, produces a considerable decrease in the yield of the final product, which results in a serious economic loss when the product is of considerable value.

An object of the present invention is to provide an apparatus for obtaining a representative sample of liquid contained in a vessel under non-atmospheric pressure conditions; that is, sub-atmospheric or superatmospheric pressure conditions. Other objects of the invention are to provide an apparatus whereby tests may be performed on the material contained in a vessel without permanently removing a portion of the material from the vessel, and without opening a closed vessel or interfering with the reaction which may be taking place therein; and to provide an apparatus whereby intermittent tests may be made, or continuous indications of the desired information may be had, concerning the condition of a liquid in a vessel. A further object of the invention is to provide, in conjunction with an apparatus for carrying out a process which includes the addition of a material to a mixture undergoing reaction until a definite concentration of material or an end-point of the reaction has been reached, means whereby a signal may be given to indicate that the desired concentration or end-point has been reached, and/or means for regulating and/or stopping the addition of the material to the mixture.

Other objects of the invention in part will be obvious and in part will appear hereinafter.

Briefly, the apparatus of the present invention comprises a vessel adapted to contain a liquid, a sampling device communicably connected with said vessel comprising a member having a passage through it for conducting liquid away from the vessel at one point and returning it to the vessel at another point, and combined means for agitating liquid in the vessel and circulating it through the sampling device. In a preferred form of the invention, the sampling device includes means for testing the liquid.

The vessel may be of any suitable size or shape, and the sampling device may be constructed and mounted in any suitable manner at any suitable location. Combined circulation of the liquid through the sampling device and agitation of the contents of the vessel may be secured in any suitable manner; for example, by such construction of the sampling member and such arrangement of it with relation to the vessel that agitation of the contents of the vessel results in circulation of the liquid through the sampling member, or by the provision of means which cause a differential pressure in different parts of the sampling member thereby causing liquid to circulate through it and consequently causing agitation of the vessel's contents (such as, an injector or other form of pump in the sampling member).

In a preferred embodiment of the invention, shown herein by way of illustration, the vessel is in the form of a substantially vertical cylindrical tank equipped with an agitator for rendering the contents of the vessel homogeneous which is adapted in operation to cause rotary movement of the liquid in the vessel. The sampling member is in the form of a conduit communicably connected with the vessel at suitable openings in the vessel wall below the point at which the surface of the liquid in the vessel stands during normal operation (hereinafter referred to as the "normal liquid level" of the vessel). It is curved in form and suitably mounted on the vessel to offer a minimum of resistance to the circulation of liquid through it. Circulation of the liquid through the sampling member is obtained by producing a differential pressure between the inlet and outlet ends of the conduit by means of the centrifugal force resulting from rotation of the liquid in the vessel. By producing a sufficient differential pressure and curving the conduit to reduce to a minimum the resistance of the conduit to the flow of liquid through it, rapid circulation may be secured through the sampling member of a sample of the liquid in the vessel.

The necessary differential pressure between the ends of the sampling member or conduit may be produced in any of a number of ways. Thus, the ends of the conduit may be so located that a large portion of the tangential component in the direction of rotation of the centrifugal force produced by the agitation causes pressure on the inlet end of the conduit and suction on the outlet end; or the ends of the conduit may project into the interior of the tank; or baffles may be provided at the rearward side (with respect to the direction of rotation of the liquid) of the inlet of the conduit and at the forward side of its outlet. Various combinations of these methods with each other or with other methods may be employed, as well as other methods for utilizing the centrifugal force produced in the rotation of the liquid in the tank for circulating the liquid through the conduit, without departing from the principle of the invention.

In the preferred embodiment of the invention, shown herein by way of illustration, the sampling member or conduit contains a testing chamber in which the liquid circulating through it may be tested. The chamber is provided with a removable cover to permit suitable testing apparatus to be inserted for making a test. Valves are also provided in the conduit between the chamber and the vessel, so that a sample of circulating liquid may be arrested in the chamber and the resulting static sample may be subjected to the desired test while remaining in the chamber, without interfering with the main body of liquid in the tank, and after the test the sample may be returned to the main body of liquid. This is particularly advantageous in those cases in which the main body of liquid is under subatmospheric or superatmospheric pressure; since, by closing the valves in the sampling member, a sample may be isolated from the remaining liquid in the vessel and may be tested under atmospheric pressure conditions substantially without altering the pressure in the vessel.

If a continuous test of the circulating liquid is desired the operative portion of suitable testing apparatus may be permanently installed in the sampling member. For example, an electrode or electrodes of suitable conductivity measuring apparatus, or the hydrogen electrode portion of a hydrogen ion concentration measuring apparatus may be mounted in the testing chamber. Thus, a platinum electrode may be mounted in the testing chamber in a plane in line with the direction of circulation of the liquid and hydrogen may be supplied to it in such a manner that the flowing stream of liquid carries the hydrogen over the surface of the electrode and into the tank. The hydrogen electrode may be connected in the usual electrical circuit for measuring hydrogen ion concentration, and, if desired, the latter may include a continuous recording or indicating means.

If the apparatus is to be employed for detecting the end-point of a chemical reaction in a reaction mixture in which there is a considerable and rapid change in hydrogen ion concentration at the end-point, the apparatus of the present invention may include suitable auxiliary mechanism for lighting a light or for giving an alarm in some other manner, actuated by the indicator or recorder of the hydrogen ion concentration measuring means, or in any other suitable manner. By the provision of such auxiliary mechanism considerable economy may be obtained in the carrying out of a process of the type mentioned; inasmuch as it no longer becomes necessary for a skilled operator carefully to watch the reaction in order to prevent its going too far; the operator need only periodically inspect the apparatus and interrupt the feed of material to the reaction mixture when the alarm is given. In some cases it is even possible to employ automatic valves in the feed lines to the tanks which may be so arranged that the feed of material may be shut off automatically by the apparatus for measuring the desired property of the liquid being tested (as for example the alarm giving means connected with the hydrogen ion concentration measuring mechanism) when the desired end-point of the reaction has been reached.

The invention will be further described in connection with the accompanying drawing which exemplifies a preferred form of apparatus embodying the principle of the invention. The invention is not limited thereto, however, and various changes in the details of construction, combination of elements, and arrangement of parts may be made within the scope of the claims.

Fig. 1 of the drawing is an elevation of a mixing tank showing the testing apparatus in place, and Fig. 2 is a plan view partially in section, of the apparatus taken along the line 2—2 of Fig. 1.

In the drawing, the apparatus is shown as a closed mixing tank 10 to which is connected a sampling member 11. The mixing tank 10, which is formed of iron or other suitable material, is shown formed with a conical bottom, and provided with an inlet 12 for liquid, a bottom discharge outlet 13, a gas inlet 14 terminating in a perforated distributing coil 15, and a gas outlet 16 controlled by a pressure release valve 17. An agitator 18 is mounted axially of the tank and suitably operated to stir liquid contained therein to cause the liquid to move in a circular path about the axis of the tank.

The sampling member 11 comprises a curved V-shaped conduit having two straight diverging end portions joined by a curved middle portion. It may be formed in any suitable manner, but for ease of construction and repair, it is formed of two straight end pipes 21 and 22, formed with flanges 23 and 24, respectively, at their outer ends, and a curved middle pipe 25, formed at its ends with flanges 26 adapted to cooperate with the flanges 23 and 24 on the end pipes 21 and 22. Bolts 27 passing through the flanges 23, 24 and 26 hold the pipes 21, 22 and 25 in operative relation.

The ends 30 and 31 of the sampling member 11 (the inner ends of pipes 21 and 22) project into the tank 10 through openings 32 and 33, respectively, formed in the wall of the tank below the normal liquid level of the tank, and form angles of about 10° to 85° with the radius of the tank at the points of intersection with the wall of the tank, the size of the angles depending upon the diameter of the tank and the distance between the ends 30 and 31 of the sampling member, as will be evident to one skilled in the art.

By this construction, a pressure effect is set up at one end 31 of the sampling member 11, and a suction effect is set up at the other end 30, due to the tangential component of the centrifugal force developed by the agitation of the liquid by the agitator 18. These combined effects produce a steady circulation of liquid from the tank 10, through the sampling member 11 and back to the tank. By proper agitation of the vessel's contents, thorough mixing and truly representative sampling may be secured. In order to increase the pressure and suction effects, the ends 30 and 31 of the pipes 21 and 22 are cut at an angle (shown as about 30°) forming points 34 and 35, and the pipes 21 and 22 are mounted with the points 34 and 35 directed toward the axis of the tank 10. For maximum efficiency of sampling, the angles formed by the pipes 21 and 22, respectively, with the radius of the tank; the lengths of the end portions of the sampling member 11, or pipes 21 and 22; and the curvature of the middle portion of the sampling member, or pipe 25, are correlated to offer a minimum of resistance and to produce substantial stream-line flow through the sampling member.

For testing the liquid circulating through the sampling member, a hollow cup-shaped member 40 is provided forming a chamber which is communicably connected with the curved pipe 25, as by a nipple 41. This testing chamber is preferably closed by a readily removable closure, shown as a screw-plug 42, which is formed with a projection 43 for cooperating with a suitable wrench for its manipulation. Obviously a handle or other manipulating means for the closure may be alternatively provided. The sampling member 11 is furthermore provided with valves 45 and 46 between the testing chamber 40 and the tank 10 to isolate liquid in the testing chamber from the remainder of the liquid in the tank, and, when the latter liquid is under non-atmospheric pressure conditions, to permit testing under atmospheric pressure conditions.

The sampling member 11 may be mounted on the tank 10 in any suitable manner. It is shown as extending into, and carried by, pipes 50 and 51, of greater internal diameter than the external diameter of the pipes 21 and 22, suitably secured to the wall of the tank 10 (as by welding) at the openings 32 and 33 in the tank. The sampling member may be secured to the pipes 50 and 51 in any suitable manner, and is shown as bolted to flanges 52 and 53, formed on the pipes 50 and 51, in cooperating relation to the flanges 23, 24 and 26 on pipes 21, 22 and 25, by means of the bolts 27. Suitable packing 54 is secured between these flanges to prevent leakage.

The sampling member 11 is shown mounted in a substantially horizontal plane. It may, however, be mounted in any other suitable position. It is preferably slightly tilted so that the ends 30 and 31 point downward toward the outlet in the bottom of the tank, to insure its complete drainage when the tank is emptied.

The operation of the apparatus just described will be explained in connection with the known isolation, by neutralization with sulfur dioxide gas, of naphthol from a mixture resulting from the fusion of naphthalene-sulfonic acid with sodium hydroxide. Obviously, it is not limited to such use, however, and may be employed in connection with a large number and variety of chemical processes.

When naphthalene sulfonic acid is fused with sodium hydroxide, there results a so-called fusion mixture which contains mainly the sodium compound of the naphthol, some sodium sulfite, residual sodium hydroxide, and a small amount of other compounds. In order to liberate the naphthol from the fusion mixture, the mixture is dissolved in water and sulfur dioxide is passed into the solution. It is desired that only an amount of sulfur dioxide be absorbed which will convert all of the available sodium present into sodium sulfite ($Na_2SO_3$) without producing substantially any sodium acid sulfite ($NaHSO_3$); because the acid sulfite has a much greater corrosive action than the sulfite on the apparatus ordinarily employed. To determine the course of the reaction, the hydrogen ion concentration of the mixture is tested, for example, by test paper, so that the addition of sulfur dioxide may be interrupted before sodium acid sulfite is formed in any substantial amount. The treatment of the dissolved fusion mixture with sulfur dioxide is preferably carried out in a closed vessel, so that unabsorbed sulfur dioxide may accumulate above the solution and build up a superatmospheric pressure which tends to increase the absorption.

In carrying out this process in the apparatus described above and illustrated in the accompanying drawing, the aqueous solution of the fusion mixture is introduced into the agitated tank 10 through the inlet 12, and sulfur dioxide gas is admitted through the distributing coil 15 while stirring the mixture by the agitator 18. With the cup 40 closed by the plug 42, valves 45 and 46 are opened, and liquid from the tank 10 is circulated through the sampling member 11 by the action of the agitator 18 until it is desired to test the acidity or hydrogen ion concentration of the solution.

To make a test, the valves 45 and 46 are closed, the plug 42 is removed from the cup 40, and suitable test paper is dipped into the liquid in the cup. The color of the test paper directly indicates whether or not the desired neutralization has been effected. The plug 42 is then reinserted, the valves 45 and 46 are again opened, and the solution is again permitted to circulate through the sampling member. When the color of the test paper indicates that the desired endpoint of the reaction has been reached, the introduction of sulfur dioxide gas is interrupted, and the liquid is discharged through the outlet 13 for further treatment.

It thus will be seen that the apparatus permits the rapid testing in a simple manner of a solution containing a noxious gas under pressure, without substantial loss of material and without interruption of the process. The agitation of the solution or mixture renders it homogeneous and the circulation of the liquid through the sampling and testing member assures that the test is made upon a representative sample. No elaborate equipment is required for circulating the liquid through the sampling member, the agitation of the liquid itself furnishing the force for producing circulation; the sampling member contains no moving parts to get out of order; and if it should become plugged it may be readily cleaned or replaced.

Since changes may be made in the construction, arrangement and combination of parts without departing from the scope of the invention, it is intended that all matter contained in the above description or shown in the accompanying drawing shall be interpreted as illustrating, and not limiting, the invention.

I claim:

1. Sampling apparatus comprising a vessel for containing a liquid to be sampled, a sampling device communicably connected with the vessel comprising a member having a passage through it for conducting liquid away from the vessel at one point and returning it to the vessel at another point and means for isolating a portion of the liquid in said member, and combined means for agitating liquid in the vessel and circulating it through the sampling device.

2. Sampling apparatus comprising a vessel for containing a liquid to be sampled, a sampling device communicably connected with the vessel comprising a member having a passage through it for conducting liquid away from the vessel at one point and returning it to the vessel at another point and means for isolating a portion of the liquid in said member, and an agitator in the vessel for agitating liquid and circulating it through the sampling device.

3. Sampling apparatus comprising a vessel for containing a liquid to be sampled an agitator in the vessel for causing rotary movement of liquid in the vessel about a substantially vertical axis, a conduit having an inlet and an outlet communicably connected with the vessel at points out of vertical alinement and so constructed and arranged that rotation of liquid in the vessel about a substantially vertical axis produces a differential pressure between the inlet and outlet of the conduit, whereby liquid is circulated through the conduit, and means for isolating a portion of the circulating liquid in the conduit.

4. Sampling and testing apparatus comprising a vessel for containing a liquid to be sampled, a sampling device communicably connected with the vessel comprising a member having a passage through it for conducting liquid away from the vessel at one point and returning it to the vessel at another point, said points being out of vertical alinement, means for testing liquid in the sampling device, and an agitator in the vessel for agitating liquid and circulating it through the sampling device.

5. Sampling and testing apparatus comprising a vessel for containing a liquid to be sampled, an agitator in the vessel for causing rotary movement of liquid in the vessel, a conduit having an inlet and an outlet communicably connected with the vessel at points out of vertical alinement and so constructed and arranged that rotation of liquid in the vessel produces a differential pressure between the inlet and outlet of the conduit, whereby liquid is circulated from the vessel through the conduit and back to the vessel, and a testing chamber in the conduit.

6. Sampling and testing apparatus comprising a vessel for containing a liquid to be sampled, an agitator in the vessel for causing rotary movement of liquid in the vessel about a substantially vertical axis, a conduit having an inlet and an outlet communicably connected with the vessel and so constructed and arranged that rotation of liquid in the vessel produces a differential pressure between the inlet and the outlet of the conduit, whereby liquid is circulated from the vessel through the conduit and back to the vessel, a testing chamber in the conduit, and valves in the conduit between the testing chamber and the vessel.

7. Sampling and testing apparatus comprising a vessel for containing a liquid to be sampled, a sampling device communicably connected with the vessel comprising a member having a passage through it for conducting liquid away from the vessel at one point and returning it to the vessel at another point, a testing chamber in the sampling device, a removable closure for the testing chamber, and combined means for agitating liquid in the vessel and circulating it through the sampling device.

8. Sampling and testing apparatus comprising a vessel for containing a liquid to be sampled, an agitator in the vessel for causing rotary movement of liquid in the vessel about a substantially vertical axis, a conduit having an inlet and an outlet communicably connected with the vessel and so constructed and arranged that rotation of liquid in the vessel produces a differential pressure between the inlet and outlet of the conduit, whereby liquid is circulated from the vessel through the conduit and back to the vessel, a testing chamber in the conduit, a removable closure for the testing chamber, and valves in the conduit between the testing chamber and the vessel.

9. Sampling and testing apparatus comprising a vessel for containing a liquid to be sampled, a conduit having an inlet and an outlet communicably connected with the vessel at points horizontally spaced from each other, said conduit being so constructed and arranged that rotation of liquid in the vessel produces a differential pressure between the inlet and outlet of the conduit, whereby liquid is circulated from the vessel through the conduit and back to the vessel, an agitator in the vessel for causing rotary movement of liquid in a direction from the inlet toward the outlet of the conduit, and a testing chamber in the conduit.

10. Sampling apparatus comprising a substantially vertical vessel for containing a liquid to be sampled, a conduit having an inlet and an outlet communicably connected with the vessel at substantially the same level and so constructed and arranged that rotation of liquid in the vessel produces a differential pressure between the inlet and outlet of the conduit, whereby liquid is circulated through the conduit, an agitator in the vessel for causing rotary movement of liquid in a substantially horizontal direction at the level of the inlet, and means for sampling liquid in said conduit.

WILLIAM J. COTTON.